(12) United States Patent
Liu

(10) Patent No.: US 8,739,947 B2
(45) Date of Patent: Jun. 3, 2014

(54) BRAKE LINING FOR A DRUM BRAKE ASSEMBLY

(75) Inventor: Weiming Liu, Novi, MI (US)

(73) Assignee: Federal-Mogul Products, Inc., Southfield, MI (US)

( * ) Notice: Subject to any disclaimer, the term of this patent is extended or adjusted under 35 U.S.C. 154(b) by 145 days.

(21) Appl. No.: 13/307,563

(22) Filed: Nov. 30, 2011

(65) Prior Publication Data

US 2013/0134001 A1    May 30, 2013

(51) Int. Cl.
*F16D 65/08* (2006.01)
*F16D 51/20* (2006.01)

(52) U.S. Cl.
USPC .............. 188/250 G; 188/250 B; 188/250 A; 188/325

(58) Field of Classification Search
USPC ....... 188/250 R, 250 G, 250 B, 250 E, 250 A, 188/250 H, 238, 240, 235
See application file for complete search history.

(56) References Cited

U.S. PATENT DOCUMENTS

| | | | |
|---|---|---|---|
| 1,250,656 A | 12/1917 | Ramey | |
| 2,355,419 A | 8/1944 | Bruce | |
| 2,828,835 A | 4/1958 | Brisson | |
| 3,003,591 A | 10/1961 | Rike | |
| 3,095,950 A | 7/1963 | Scheel | |
| 3,368,648 A | 2/1968 | Brownyer | |
| 3,378,113 A * | 4/1968 | Fisher et al. | 188/206 A |
| 3,398,814 A | 8/1968 | Deibel | |
| 3,467,229 A | 9/1969 | Deibel | |
| 3,693,772 A | 9/1972 | Tani | |
| 4,200,174 A | 4/1980 | Borugian et al. | |
| 4,353,442 A | 10/1982 | Correa | |
| 4,372,430 A | 2/1983 | Borugian | |
| RE31,531 E | 3/1984 | Williams | |
| 4,471,859 A | 9/1984 | Urban | |
| 4,476,968 A | 10/1984 | Urban et al. | |
| 4,624,348 A | 11/1986 | Williams | |
| 4,732,240 A | 3/1988 | Flaim | |
| 4,771,870 A | 9/1988 | Belk | |
| 5,044,475 A | 9/1991 | Clark | |
| 5,535,859 A * | 7/1996 | Zeng | 188/250 B |

(Continued)

FOREIGN PATENT DOCUMENTS

| | | |
|---|---|---|
| DE | 1258675 B | 1/1968 |
| DE | 1280694 B | 10/1968 |

(Continued)

OTHER PUBLICATIONS

International Search Report mailed Jan. 23, 2013 (PCT/US2012/059414).

*Primary Examiner* — Anna Momper
(74) *Attorney, Agent, or Firm* — Robert L. Stearns; Dickinson Wright, PLLC

(57) ABSTRACT

An improved drum brake assembly for reducing braking vibrations and noise. The improved assembly includes a pair of shoes, each extending through an arc and presenting an outer shoe surface. A pair of brake linings of a friction material are coupled to the outer shoe surface. Each of the brake linings has an upper surface and a pair of oppositely facing chamfered edges. Each chamfered edge has an arc length of no less than one inch and is disposed at an angle of between ten and twenty-five degrees from the tangent of the upper surface where it meets the chamfered edge.

20 Claims, 2 Drawing Sheets

(56) References Cited

U.S. PATENT DOCUMENTS

| | | | |
|---|---|---|---|
| 5,791,443 A | 8/1998 | Manz | |
| 5,836,428 A | 11/1998 | Young | |
| 5,971,112 A | 10/1999 | Okada et al. | |
| 5,975,255 A | 11/1999 | Monroe et al. | |
| 6,354,411 B1 | 3/2002 | Asai et al. | |
| 7,322,448 B2 * | 1/2008 | Hulten | 188/250 B |
| 2001/0003320 A1 | 6/2001 | Asai et al. | |
| 2006/0225975 A1 | 10/2006 | Pfaff | |
| 2007/0056816 A1 | 3/2007 | Hayford et al. | |
| 2008/0251330 A1 | 10/2008 | Kobayashi | |
| 2009/0159380 A1 | 6/2009 | Kobayashi et al. | |

FOREIGN PATENT DOCUMENTS

| | | |
|---|---|---|
| DE | 1400358 A1 | 12/1968 |
| GB | 2087995 A | 6/1982 |
| JP | 52054873 | 5/1977 |

* cited by examiner

BRAKE LINING FOR A DRUM BRAKE ASSEMBLY

BACKGROUND OF THE INVENTION

1. Field of the Invention

The subject invention is directed to heavy-duty vehicle drum brakes.

2. Related Art

Despite the increasing popularity of disc brakes, drum brakes remain a popular choice for many braking applications. Conventional drum brake assemblies include a circular drum and a pair of shoes, each with at least one brake lining disposed thereon. During braking, the shoes are pushed against an inner surface of the drum, which generates friction between the brake linings and the drum. This friction converts kinetic energy from the movement of the vehicle into heat, thereby slowing the vehicle. The friction also causes the brake linings to wear out, and therefore, the brake linings have to be periodically replaced.

Known problems with drum brakes include excessive vibrations and noise which can occur during braking. Apart from agitating the occupants of the vehicle and the general public, such vibrations can reduce the performance of the brakes. For passenger vehicles, brake manufacturers have begun producing brake linings with leading and trailing chamfered edges in order to reduce the braking vibrations and noise. The chamfered edges of most prior art brake linings are very steeply angled and comprise only a small portion of the brake lining. While effective for smaller vehicles, brake linings having steeply angled and short chamfered edges may not eliminate all noise and vibrations for heavy-duty vehicles.

SUMMARY OF THE INVENTION

An aspect of the present invention is to provide an improved drum brake assembly for heavy duty vehicles with reduced braking vibrations and noises. This improved drum brake assembly includes a brake lining of a high friction material, having a curved upper surface, and having a pair of oppositely facing chamfered edges. Each of the chamfered edges has an arc length of no less than one inch (1") and is disposed at an angle of between ten and twenty-five degrees (10°-25°) from the tangent of the upper surface where it meets the chamfered edge. Despite the reduction in friction surface area between the brake lining and the drum, braking performance is not compromised because of the corresponding reduction in braking vibrations attributed to the presence of the chamfers. The reduction in braking vibrations and noises lasts until the chamfered edges are worn out, at which point, the occurrence of braking vibrations and noises will provide the driver of the vehicle with a reminder that his or her brake linings should be replaced.

According to another aspect of the invention, the chamfered edges extend along between twenty-five and thirty-five percent (25-35%) of the arc length of the brake lining. This range is advantageous for optimizing brake noise without compromising the braking performance and lining life.

BRIEF DESCRIPTION OF THE DRAWINGS

These and other advantages and features of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
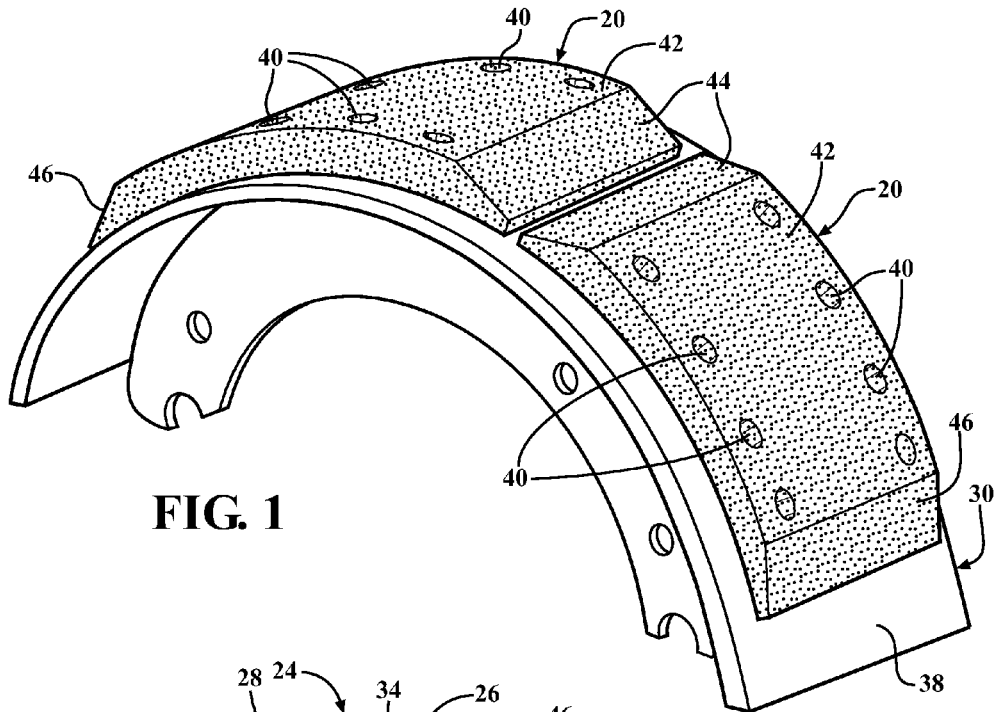
FIG. 1 is a perspective and elevation view of a pair of exemplary brake linings.

Referring to the Figures, wherein like numerals indicate corresponding parts throughout the several views, an exemplary brake lining 20 for a drum brake assembly 22 of a heavy duty vehicle is generally shown in FIG. 1. The brake lining 20 is well adapted for use in heavy-duty trucks and equipment, such as a semi-tractors and trailers, buses, dump trucks, fire trucks, garbage trucks, etc., but also finds use in other applications, such as trailers, air planes, trains, etc.

Figure 2:
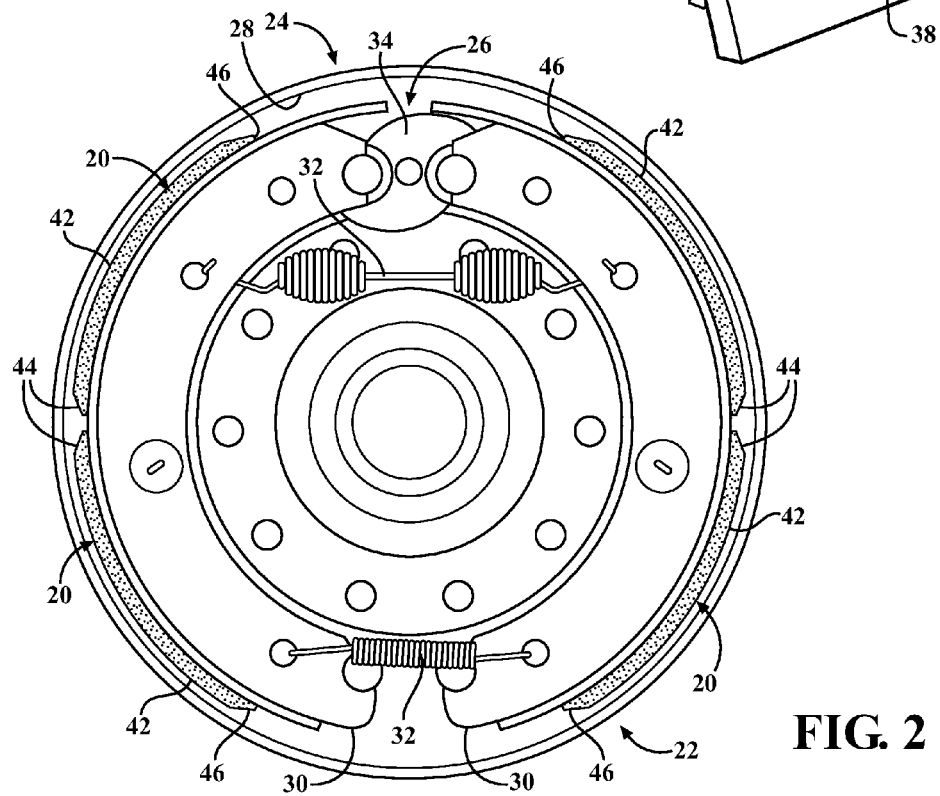
FIG. 2 is a side and elevation view of an exemplary drum brake assembly.
Figure 3:
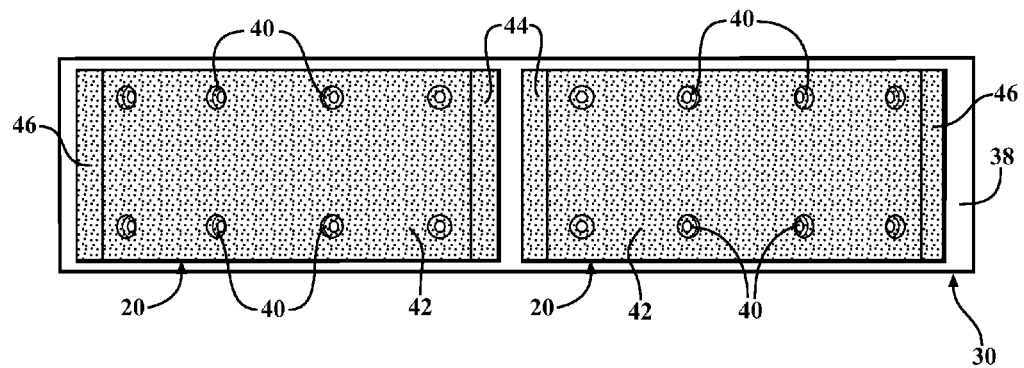
FIG. 3 is a top elevation view of the exemplary brake linings of FIG. 1.

Referring now to FIG. 2, one type of a conventional type of drum brake assembly 22 for use in heavy-duty vehicles is shown. The drum brake assembly 22 includes a drum 24 and a braking mechanism 26. The drum 24 has a circular drum surface 28 projecting from a base hub and is supported for rotation on a wheel spindle (not shown) of the vehicle. The drum 24 in turn mounts a wheel of the vehicle (typically via a plurality of wheel studs and nuts), and rotation of the wheel imparts rotation of the drum 24 and spindle in a known manner. The braking mechanism 26 is housed within the drum 24 and includes a pair of brake shoes 30, a pair of biasing springs 32 for biasing the shoes 30 in a non-braking position and an actuating device 34 operative to displace the brake shoes 30 between outward into a braking position in a known manner. The actuating device 34 is typically a pneumatic driven cam shaft 34 but can also be hydraulic brake cylinders, an electric motor, or any other type of actuator. Each brake shoe 30 includes at least one brake lining 20 disposed thereon for frictionally engaging the circular drum surface 28. The braking mechanism 26 may also include an adjuster (not shown) for maintaining the brake linings 20 adjacent the circular drum surface 28 throughout the life of the brake linings 20 in a manner known to those of skill in the art. The brake assembly 22 may optionally include an emergency brake (not shown), or a parking brake, for mechanically urging the shoes 30 apart until the brake linings 20 engage the circular drum surface 28 of the drum 24.

In operation, when braking of the vehicle is desired, the shoes 30 are pushed outwardly via the rotation of the cam shaft 34 to press the brake linings 20 firmly against the circular drum surface 28. The kinetic friction generated between these two components slows the rotation of the drum 24, thus reducing the speed of the vehicle. Upon release of the actuating device 34, the brake shoes 30 are automatically returned via spring bias force from the biasing springs 32 back toward their original inward non-braking position.

Referring back to FIG. 1, each of the shoes 30 has an outer shoe surface 38 with a pair of brake linings 20 disposed thereon. The brake linings 20 are disposed adjacent one another along the arc of the outer surface of the shoe 30. The exemplary embodiment includes a pair of brake linings 20 on each shoe 30, but it should be appreciated that any number of brake linings 20 could be disposed on each shoe 30. The brake linings 20 are of a high friction material such as an organic compound, a ceramic compound, a semi-metallic compound or a metallic compound. Each brake lining 20 could also have a single layer of the high friction material, or it could have multiple layers of different high friction materials.

The exemplary brake linings 20 are removable from the brake shoes 30 and include a plurality of apertures 40 for receiving removable fasteners, such as rivets. Thus, when the brake linings 20 wear thin, they can be unfastened from the shoe 30 and replaced without replacing the entire shoes 30. Alternately, the brake linings 20 could be coupled to the shoes 30 through non-removable rivets, adhesives, over-molding, etc.

Figure 4:
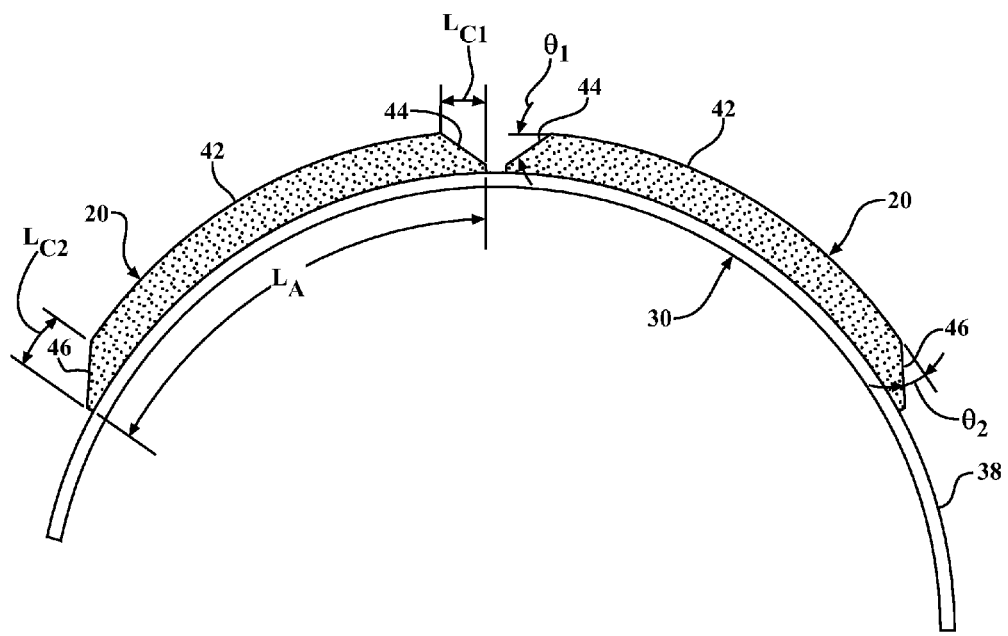
FIG. 4 is a side elevation view of the exemplary brake linings of FIG. 1.

Referring now to FIG. 4, each of the brake linings 20 includes an upper surface 42 extending through a convex curve which complements the concave curvature of the circular drum surface 28. A pair of chamfered edges 44, 46 (hereinafter referred to as a first chamfered edge 44 and a second chamfered edge 46) are provided at the opposite ends of the linings 20. Depending on the direction the vehicle's movement (forward or reverse), one of the chamfered edges 44, 46 will be the leading edge in engagement with the circular drum surface 28 and the other will be a trailing edge. The brake linings 20 are preferably formed through a molding process, and the chamfered edges 44, 46 can either be formed during the molding process or they can be formed by removing material, such as by grinding or machining, after the molding is complete. However, it should be appreciated that the brake linings 20 and the chamfered edges 44, 46 can be formed through any desirable process.

Each of the chamfered edges 44, 46 of the brake lining 20 is disposed at an angle $\Theta_1$, $\Theta_2$ of between ten and twenty-five degrees (10-25°) relative to the tangent of the upper surface 42 where it meets the chamfered edge 44, 46. This angle $\Theta_1$, $\Theta_2$ extends along the width of the brake lining 20, i.e. the chamfered edges 44, 46 are generally flat. For heavy-duty vehicles, this range provides for substantially reduced braking noise and vibrations as compared to brake linings without chamfered edges or with more sharply angled chamfered edges 44, 46.

As initially formed, i.e. before wear, each chamfered edge 44, 46 has a length $L_{C1}$, $L_{C2}$ of no less than one inch (1"), and together, the chamfered edges 44, 46 extend through between twenty-five and thirty-five percent (25-35%) of the arc length $L_A$ of the brake lining 20. The lengths $L_{C1}$, $L_{C2}$ of the chamfered edges 44, 46 optimize the brake noise without compromising the braking performance and the life of the brake lining 20. Once the brake linings 20 are worn to the point where they no longer have chamfered edges 44, 46, then the resulting noise and vibrations can provide a driver of the vehicle with an alert that his or her brake linings 20 should to be replaced.

The angles $\Theta_1$, $\Theta_2$ of the first and second chamfered edges 44, 46 can be different from one another. For example, as shown in FIG. 4, the first chamfered edges 44 of the exemplary brake linings 20 are disposed at a first angle $\Theta_1$ which is steeper than the second angle $\Theta_2$ than the second chamfered edges 46. The exemplary brake linings 20 are also oriented such that the steeper first chamfered edges 44 towards one another while the shallower second chamfered edges 46 face away from one another.

Obviously, many modifications and variations of the present invention are possible in light of the above teachings and may be practiced otherwise than as specifically described while within the scope of the appended claims.

What is claimed is:

1. A brake lining for a drum brake assembly of a heavy-duty vehicle comprising:

said brake lining being of a friction material and having an upper surface and presenting a pair of oppositely facing chamfered edges which extend through less than an entire thickness of said brake lining, and wherein said oppositely facing chamfered edges are the only chamfered edges on said brake lining and comprise between twenty-five and thirty-five percent of the arcuate length of said brake lining and wherein each of said chamfered edges is disposed at an angle of between ten and twenty-five degrees from the tangent of said upper surface where it meets said chamfered edge.

2. The brake lining of claim 1 wherein said brake lining is generally arcuately shaped.

3. The brake lining of claim 2 wherein each of said chamfered edges has a length of no less than one inch.

4. The brake lining of claim 1 wherein said opposite chamfered edges are disposed at different angles relative to the top surface than one another.

5. A shoe for a drum brake assembly of a heavy-duty vehicle comprising:

said shoe extending through an arc and presenting an outer shoe surface;

at least one brake lining coupled to said outer shoe surface and being of a friction material;

said brake lining having an upper surface and presenting a pair of oppositely facing chamfered edges which extend through less than an entire thickness of said brake lining; and wherein said oppositely facing chamfered edges are the only chamfered edges on said brake lining and comprise between twenty-five and thirty-five percent of the arcuate length of said brake lining and wherein each of said chamfered edges is disposed at an angle of between ten and twenty-five degrees from the tangent of said upper surface where it meets said chamfered edge.

6. The shoe as set forth in claim 5 wherein said brake lining is generally arcuately shaped.

7. The shoe as set forth in claim 6 wherein each of said chamfered edges has a length of no less than one inch.

8. The shoe as set forth in claim 5 further including a pair of brake linings disposed adjacent to one another on said outer shoe surface.

9. The shoe as set forth in claim 8 wherein each of said brake linings includes a first chamfered edge disposed at a first angle from the tangent of said upper surface where it meets said first chamfered edge and a second chamfered edge disposed at a second angle from the tangent of said upper surface where it meets said second chamfered edge.

10. The shoe as set forth in claim 9 wherein said first angle of said first chamfered edge is different than said second angle of said second chamfered edge.

11. The shoe as set forth in claim 10 wherein said first chamfered edges of adjacent brake linings face towards one another and said second chamfered edges of adjacent brake linings face away from one another.

12. The shoe as set forth in claim 11 wherein said first angles of said first chamfered edges are greater than said second angles of said second chamfered edges.

13. A drum brake assembly for slowing a vehicle having a drum with a circular drum surface comprising:

a pair of shoes, each extending through an arc and presenting an outer shoe surface;

at least one brake lining coupled to at least one of said outer shoe surfaces and being of a friction material;

said brake lining having an upper surface and presenting a pair of oppositely facing chamfered edges which extend through less than the entire thickness of said brake lining; and wherein said oppositely facing chamfered edges are the only chamfered edges on said brake lining and comprise between twenty-five and thirty-five percent of the arcuate length of said brake lining and wherein each of said chamfered edges is disposed at an angle of between ten and twenty-five degrees from the tangent of said upper surface where it meets said chamfered edge.

14. The drum brake assembly as set forth in claim 13 wherein said brake lining is generally arcuately shaped.

15. The drum brake assembly as set forth in claim 14 wherein each of said chamfered edges has a length of no less than one inch.

16. The drum brake assembly as set forth in claim 13 said at least one brake lining includes a pair of linings disposed adjacent to one another on said outer shoe surface.

17. The drum brake assembly as set forth in claim 16 wherein each of said brake linings includes a first chamfered edge disposed at a first angle from the tangent of said upper surface where it meets said first chamfered edge and a second chamfered edge disposed at a second angle from the tangent of said upper surface where it meets said second chamfered edge.

18. The drum brake assembly as set forth in claim 17 wherein said first angle of said first chamfered edge is different than said second angle of said second chamfered edge.

19. The drum brake assembly as set forth in claim 18 wherein said first chamfered edges of adjacent brake linings face towards one another and said second chamfered edges of adjacent brake linings face away from one another.

20. The drum brake assembly as set forth in claim 19 wherein said first angles of said first chamfered edges are greater than said second angles of said second chamfered edges.

* * * * *